United States Patent
Bremicker

(10) Patent No.: US 9,923,483 B2
(45) Date of Patent: Mar. 20, 2018

(54) METHOD FOR OPERATING AN INVERTER AND INVERTER COMPRISING A SWITCH BETWEEN A CENTER POINT OF A DC LINK AND A CONNECTION FOR A NEUTRAL CONDUCTOR OF AN AC GRID

(71) Applicant: SMA Solar Technology AG, Niestetal (DE)

(72) Inventor: Sven Bremicker, Alheim (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/163,329

(22) Filed: May 24, 2016

(65) Prior Publication Data
US 2016/0268923 A1      Sep. 15, 2016

Related U.S. Application Data

(63) Continuation of application No. PCT/EP2014/074601, filed on Nov. 14, 2014.

(30) Foreign Application Priority Data

Nov. 25, 2013   (DE) .......... 10 2013 113 000

(51) Int. Cl.
*H02M 7/48*   (2007.01)
*H02M 1/12*   (2006.01)
(Continued)

(52) U.S. Cl.
CPC ........... *H02M 7/4807* (2013.01); *H02J 3/383* (2013.01); *H02M 1/12* (2013.01); *H02M 5/458* (2013.01);
(Continued)

(58) Field of Classification Search
CPC ...... H02M 7/4807; H02M 5/458; H02M 1/12; H02M 7/487; H02M 1/126; H02M 2001/123
See application file for complete search history.

(56) References Cited

U.S. PATENT DOCUMENTS 6,549,385 B1 * 4/2003 Bald ................ H02H 5/12
                                                        361/42
8,854,846 B2   10/2014 Nuss et al.
(Continued)

FOREIGN PATENT DOCUMENTS

| EP | 2421142 A1 | 2/2012 |
| EP | 2582030 A2 | 4/2013 |
| EP | 2608375 A2 | 6/2013 |

OTHER PUBLICATIONS

Edelmoser, Common Mode Problematic of Solar Inverter Systems, Proceedings of the 11th WSEAS International Conference on Circuits, Ajios Nikolaos, Crete Island, Greece, Jul. 23-25, 2007, pp. 131-135.
International Search Report dated Jan. 23, 2015 PCT/EP2014/074601.

*Primary Examiner* — Jue Zhang
*Assistant Examiner* — Lakaisha Jackson
(74) *Attorney, Agent, or Firm* — Eschweiler & Potashnik, LLC

(57) ABSTRACT

A method of operating a transformerless inverter connected on the input side to a generator and on the output side to a multiphase AC grid and comprising a multi-phase inverter bridge with a switch between a midpoint of a DC intermediate circuit on the input side and a terminal for a neutral conductor of the multiphase AC grid, includes feeding electric power from the DC intermediate circuit into the AC grid by the inverter bridge with the switch closed when first operating conditions are present, and opening the switch when there is a transition from the first operating conditions
(Continued)

to second operating conditions different from the first operating conditions. The method further includes feeding electric power from the DC intermediate circuit into the AC grid by the inverter bridge with the switch open when the second operating conditions are present, and closing the switch when there is a transition from the second operating conditions to the first operating conditions.

9 Claims, 1 Drawing Sheet

(51) Int. Cl.
  *H02J 3/38* (2006.01)
  *H02M 7/487* (2007.01)
  *H02M 5/458* (2006.01)
(52) U.S. Cl.
  CPC ............ *H02M 7/487* (2013.01); *H02M 1/126* (2013.01); *H02M 2001/123* (2013.01); *Y02E 10/563* (2013.01)

(56) References Cited

U.S. PATENT DOCUMENTS

| | | | |
|---|---|---|---|
| 9,172,311 B2 | 10/2015 | Jussila et al. | |
| 2009/0244936 A1* | 10/2009 | Falk | H02M 7/487 363/40 |
| 2012/0068655 A1 | 3/2012 | Inuduka et al. | |
| 2013/0229837 A1 | 9/2013 | Wang et al. | |
| 2014/0112039 A1* | 4/2014 | Correa Vasquez | H02M 7/487 363/98 |
| 2014/0132278 A1* | 5/2014 | Tang | G01R 31/007 324/509 |
| 2015/0280607 A1* | 10/2015 | Wachenfeld | H02M 7/48 363/95 |
| 2015/0311862 A1* | 10/2015 | Lee | H02S 50/00 702/58 |
| 2016/0099569 A1* | 4/2016 | Rilling | G01R 31/3278 307/125 |
| 2016/0124038 A1* | 5/2016 | Matsushita | G01R 31/025 324/510 |
| 2017/0264212 A1* | 9/2017 | Muguerza Olcoz | H02M 7/44 |

* cited by examiner

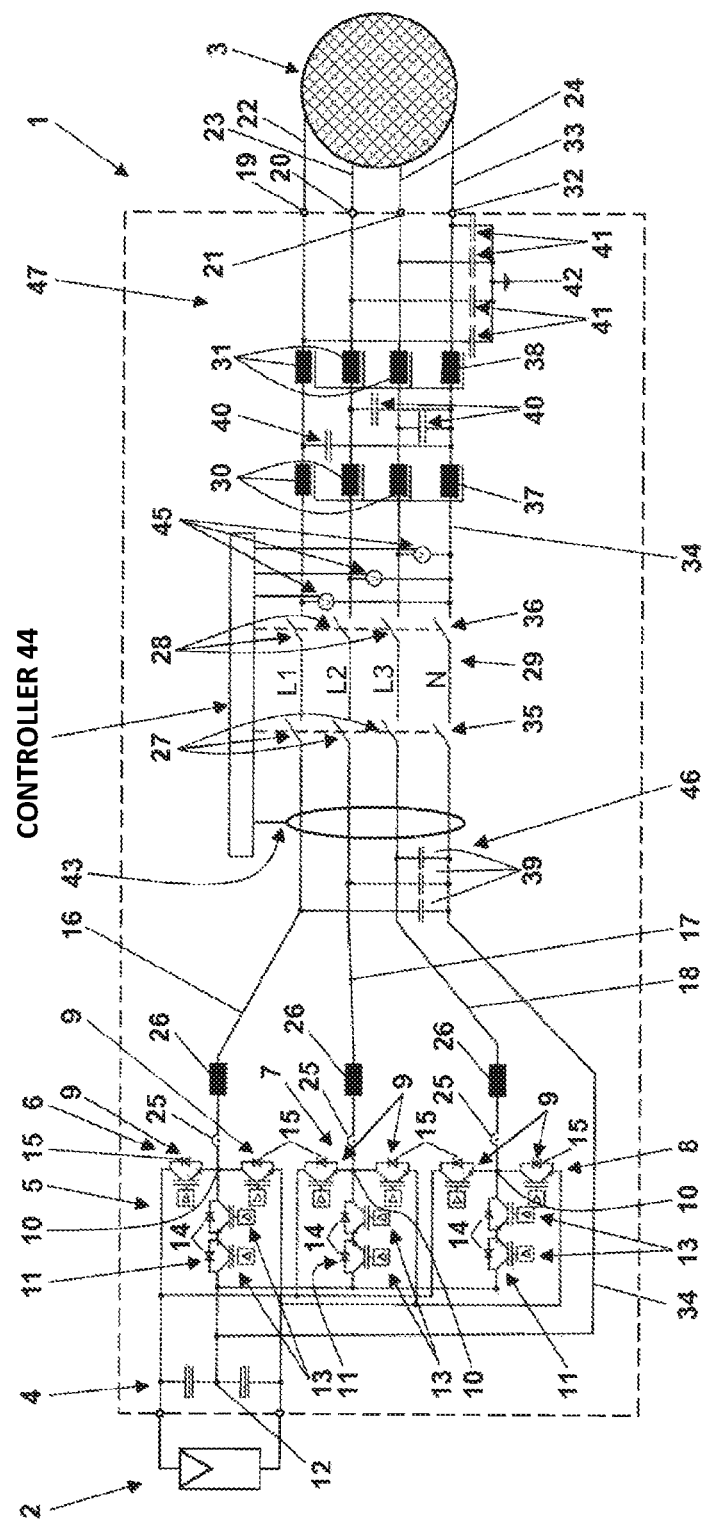

METHOD FOR OPERATING AN INVERTER AND INVERTER COMPRISING A SWITCH BETWEEN A CENTER POINT OF A DC LINK AND A CONNECTION FOR A NEUTRAL CONDUCTOR OF AN AC GRID

CROSS REFERENCE TO RELATED APPLICATIONS

This application claims priority to International Patent Application number PCT/EP2014/074601, filed on Nov. 14, 2014, which claims priority to German Patent Application number 10 2013 113 000.3, filed on Nov. 25, 2013, and is hereby incorporated by reference in its entirety.

TECHNICAL FIELD

The disclosure relates to a method for operating an inverter connected on the input side to a generator and on the output side to a multiphase AC grid with a switch between a midpoint of a DC intermediate circuit and a terminal for a neutral conductor of an AC network and to a corresponding inverter. The neutral conductor of an AC grid is also called zero conductor.

BACKGROUND

An inverter connected on the input side to a generator and on the output side to a multiphase AC grid and with a switch between a midpoint of a DC intermediate circuit and a terminal for a neutral conductor of an AC grid is known from EP 2608375 A2. Whenever electric power is fed from a photovoltaic generator connected to the DC intermediate circuit into the AC grid by this known inverter, the switch is closed. The switch is an electromechanical switch connected in series with a further electromechanical switch. Such series arrangements of two electromechanical switches are also provided between an inverter bridge of the inverter and the terminals for the phase conductors of the AC grid. In order to test the electromechanical switches between the midpoint of the DC intermediate circuit and the terminal for the neutral conductor with respect to their separation performance, the switches may be opened and closed individually.

Even for testing the electromechanical switches, no state of the inverter in which all electromechanical switches between the inverter bridge and the terminals for the phase conductors of the AC grid are closed, while one or both electromagnetic switches between the midpoint of the DC intermediate circuit and the terminal for the neutral conductor is or are closed, respectively, is described in EP 2608375 A2.

From EP 2107672 A1 a three-phase inverter connected on the input side to a generator and on the output side to a multiphase AC grid without connection between the neutral line of the AC grid and the midpoint of the DC intermediate circuit is known. This inverter has a high efficiency, and it is functioning at a low intermediate circuit voltage in the DC intermediate circuit. However, it turns out that in this inverter a leakage current flowing from a generator connected to the DC intermediate circuit is relatively large. In addition, no asymmetric feed of electricity into the different phases of the AC grid is possible.

In the three-phase inverter known from EP 2107672 A1, the midpoint of the DC intermediate circuit is connected via filter capacitors to lines leading from the midpoints of the half-bridges of the inverter bridge of the inverter to the phase lines of the grid and with filter inductances being arranged in these lines. The half-bridges are configured as multi-level circuits, in particular as three-level circuits. The midpoints of the inverter bridges are each connected to the midpoint of the DC intermediate circuit via a bidirectional switch composed of two series-connected semiconductor switches with opposite blocking directions.

From EP 2375552 A1 an operating method of an inverter as described in EP 2107672 A2 and connected on the input side to a generator and on the output side to a multiphase AC grid is known. In this known method, the leakage current occurring during operation of the inverter is reduced by increasing the intermediate circuit voltage of the DC intermediate circuit on the input side of the inverter. This is possible in the range of low intermediate voltages, which is permitted by an inverter without connection between the midpoint of its DC intermediate circuit and the neutral line of the AC grid connected on the output side. In this voltage range between the peak value of the phase-to-phase line voltage of the AC grid and the double value of the peak phase-to-neutral line voltage of the AC grid, the switches of the inverter bridge are driven such that the AC currents fed into the phase lines are formed by so-called overmodulation. This overmodulation results in a leakage current that increases with increasing degree of overmodulation at decreasing intermediate circuit voltage. Accordingly, the leakage current, which further depends on the leakage capacitance of the generator connected to the DC intermediate circuit, may be reduced by increasing the intermediate circuit voltage.

From EP 2367272 A2 an inverter connected on the input side to a generator and comprising a three-phase bridge circuit is known, wherein phase lines at the output side of the inverter may be connected to a three-phase AC grid. The inverter comprises no connection to the neutral line of the AC grid. A capacitor is connected to each phase line, respectively, the capacitors being connected to a common connection point. An intermediate circuit on the input side of the inverter is connected to a serial arrangement of balancing capacitors being connected to the connection point via a damping resistor.

From US 2013/0229837 A1 a transformerless converter is known that is operated as an active filter to improve the power quality of an AC grid. The converter comprises a three-phase converter bridge connected on the AC side to the AC grid and on the DC side to a DC intermediate circuit. A controllable switch is provided between a midpoint of the DC intermediate circuit and a terminal for a neutral conductor of the multi-phase AC grid. The switch is combined with two separate choke modules in two branches of the neutral line connected to the midpoint of the actual DC intermediate circuit on the one hand and to the center point of an auxiliary capacitor module on the other hand. The converter may be configured by the switch to be either in a 3p3w configuration at open switch or in a 3p4w configuration at closed switch. The auxiliary capacitor module, which increases the capacity of the DC intermediate circuit in order to suppress ripple currents, forms part of the 3p4w structure then.

SUMMARY

The disclosure provides a method for operating an inverter connected on the input side to a generator and on the output side to a multiphase AC grid and of providing a corresponding inverter covering a larger number of operating conditions in an optimal way when connected on the input side to a generator with large leakage capacitance.

In a method for operating a transformerless inverter connected on the input side to a generator and on the output side to a multiphase AC grid and comprising a multiphase inverter bridge with a switch between a midpoint of the DC intermediate circuit on the input side and a terminal for a neutral conductor of the multiphase AC grid, electrical power is fed from the DC intermediate circuit into the AC grid by the inverter bridge at closed switch, when first operating conditions are present, while electrical power is fed from the DC intermediate circuit into the AC grid by the inverter bridge at open switch, when second operating conditions different from the first operating conditions are present. Thus, in the method according to the disclosure, the connection between the midpoint of the DC intermediate circuit on the input side and the terminal for the neutral conductor of the multiphase AC grid is established or interrupted depending on the present operating conditions.

Accordingly, at the present operating conditions, the efficiency of the inverter may be optimized, an increasing leakage current may be minimized, an asymmetric feed into the phase lines of the AC grid may be realized and/or a lower or higher intermediate circuit voltage may be used optimally.

It is understood that executing the method according to the disclosure practically requires that when the switch is open the inverter comprises an effective circuit appropriate for an inverter without connection between the midpoint of its DC intermediate circuit on the input side and the neutral line of the AC grid, wherein the midpoint of the DC intermediate circuit is for example connected to the phase lines of the AC grid via capacitors. Such a connection via capacitors may additionally exist between the phase lines of the AC grid and the neutral line of the AC grid. As long as the switch is open, the midpoint of the input-side DC intermediate circuit and the neutral line remain however galvanically isolated. When the switch is closed, an effective circuit appropriate for an inverter then results, with a connection between the midpoint of the DC intermediate circuit on the input side and the neutral line of the AC grid connected on the output side.

The second operating conditions, under which electric power is fed from the DC intermediate circuit into the AC grid at open switch, may be characterized in that a residual current or leakage current measured at the inverter maintains a first current limit at open switch. In other words, the value of the residual current or the leakage current provides no reason to close the switch. In this case, residual current does not refer to the residual current caused by an error, but to the residual current occurring in an error-free operation of the inverter with the capacitive leakage current from the generator connected to the DC intermediate circuit forming a substantial current component thereof.

Conversely, a residual current or leakage current measured at the inverter and maintaining a second current limit at closed switch may be an indication to open the switch. In this case, the second current limit may be significantly lower than the first current limit to take into account the fundamentally higher residual current caused by the operation at open switch and to avoid frequent actuation of the switch.

In principle, the same criterion as for the current limits may be applied if a leakage capacitance value determined for the generator connected to the DC intermediate circuit maintains a capacitance limit. The value of the leakage capacitance defines the leakage current occurring at a specified operation of the inverter and thus the residual current. As long as the leakage capacitance maintains the capacitance limit, it is possible to maintain the first and second current limit values when the switch is open or closed, respectively. A method for determining the leakage capacitance of a generator is known for example from WO 2011/121056 A1.

A sufficient criterion for the presence of the second operating conditions is further that an intermediate voltage of the DC intermediate circuit does not reach the double value of the peak phase-to-neutral line voltage of the AC grid. However, it is a necessary criterion for the presence of the second operating conditions that a symmetric feed into all phase lines of the AC grid is intended.

Converse considerations apply to the first operating conditions. It is a sufficient criterion for their presence that an asymmetric feed into the phase lines of the AC grid is intended. Furthermore, the first operating conditions are present if a residual current or leakage current measured at the inverter exceeds the first current limit at open switch or exceeds the second current limit at closed switch. The corresponding criterion with regard to the leakage capacitance is that the leakage capacitance determined for the generator connected to the DC intermediate circuit exceeds the capacitance limit.

If a transition from the second operating conditions to the first operating conditions is detected in the method according to the disclosure, the switch is closed and the control of the inverter bridge of the inverter is adapted accordingly, if necessary. Converse considerations apply to a transition from the first operating conditions to the second operating conditions, wherein the control of the inverter bridge of the inverter is then adapted to the operation at open switch, if necessary.

At open switch, a residual current or leakage current measured at the inverter may be reduced or maintained comparably small by increasing an intermediate voltage of the DC intermediate circuit from a value above the peak phase-to-phase line voltage to a value above the double value of the peak phase-to-neutral line voltage of the AC grid. This may be used to initially limit the residual current before closing the switch, because this closing is associated with disadvantages with regard to the efficiency of the inverter. The peak phase-to-phase line voltage of the AC grid defines the minimum value of the intermediate circuit voltage. Below this value, no undistorted AC current may be emitted even at open switch. Above the peak phase-to-phase line voltage of the AC grid an undistorted AC current may be emitted at open switch by overmodulation.

The overmodulation is required up to the double peak value of the phase-to-neutral line voltage of the AC grid and, at constant leakage capacitance of the generator connected to the DC intermediate circuit, results in an increased leakage current that decreases with increasing intermediate voltage. A way to operate the inverter bridge of the inverter under overmodulation may be derived, for example, from EP 2375552 A1.

A transformerless inverter according to the disclosure with a DC intermediate circuit on the input side, a multiphase inverter bridge, terminals for a multiphase AC grid, and a switch between a midpoint of the DC intermediate circuit on the input side and the terminal for a neutral conductor of the multiphase AC grid comprises a controller controlling the inverter bridge and the switch according to the method according to the disclosure.

To detect the first and second operating conditions, a measuring device for measuring the residual current of the inverter or a leakage current from the generator connected on the input side to the inverter may be connected to the controller, wherein the measuring device comprises a residual current sensor. The inverter bridge may comprise a multi-level circuit. In particular, it may be a three-level circuit of the type NPC (Neutral Point Clamped). More particularly, it may be a BSNPC (Bidirectional Switch Neutral Point Clamped) circuit with bidirectional switches between the midpoint of the DC intermediate circuit and the midpoints of its half-bridges. These bidirectional switches may be composed of pairs of series or parallel connected semiconductor switches with opposite blocking directions.

The switch between the midpoint of the DC intermediate circuit and the terminal for the neutral conductor may be arranged in a line connecting the midpoint of the DC intermediate circuit to the terminal for the neutral conductor at a point located between first and second capacitors connected to the line. The first and second capacitors are in this case connected at their other ends to lines leading to the terminals for the phase conductors of the AC grid. The first and second capacitors may be parts of a first and a second filter of the inverter, each comprising additional inductances in the lines to the terminals for the phase conductors of the AC grid.

The switch between the midpoint of the DC intermediate circuit and the neutral conductor of the AC grid may be part of a relay for connecting the inverter to the AC grid. This relay then comprises further switches in the lines leading from the inverter bridge to the terminals for the phase conductors of the AC grid. Unlike a normal relay with synchronously operated individual switches in the individual lines, however, the switch in the line to the neutral conductor of the AC grid is configured to be switched separately in one embodiment. The relay may as well, as is also otherwise often the case, comprise two series-connected electromechanical switches in each line.

Advantageous developments of the disclosure result from the claims, the description and the drawings. The advantages of features and combinations of several features mentioned in the description are merely examples and may alternatively or cumulatively come into effect without the advantages to be necessarily achieved by embodiments of the disclosure. Without changing the scope of the claimed subject matter of the attached patent claims, the following applies with regard to the disclosed content of the originally filed application documents and the patent: further features may be derived from the drawings—in particular from the relative arrangement and the interaction between various components. The combination of features of different embodiments of the disclosure or of features of different claims is also possible, deviating from the chosen back references of the claims and is suggested herewith. This also relates to such features that are shown in separate drawings or are mentioned in the corresponding description. These features may also be combined with features of different claims. In addition, features listed in the claims may be omitted in further embodiments of the disclosure.

The features mentioned in the claims and the description are to be understood with respect to their number such that exactly this number or a greater number than the mentioned number is present without requiring the explicit use of the word "at least". If, for example, an element is mentioned, this should be understood in a way that exactly one element, two elements or more elements are present. These features may be supplemented by other features or be the only features that are comprised in the respective product.

Reference numerals contained in the claims do not limit the scope of the subject matter protected by the claims. They are intended only to make the claims easier understandable.

BRIEF DESCRIPTION OF THE DRAWINGS

In the following the disclosure is further illustrated and described by way of an embodiment with reference to the accompanying drawing.

FIG. 1 shows the basic structure of an inverter according to the disclosure.

DETAILED DESCRIPTION

FIG. 1 shows an inverter 1 according to the disclosure, the input side of which being connected to a photovoltaic generator 2 and the output side being connected to a three-phase AC grid 3. The photovoltaic generator 2 as an example of a generator with distinct leakage capacitance to ground charges a split DC intermediate circuit 4 of the inverter 1, wherein the split DC intermediate circuit 4 is connected to a three-phase inverter bridge 5. The three half-bridges 6 to 8 of the inverter bridge 5 are each configured as three-level circuits of Bidirectional Switch Neutral Point Clamped (BSNPC) type. For this purpose, they comprise a bidirectional switch 11 between the midpoint 10 and a midpoint 12 of the DC intermediate circuit 4, in addition to switches 9, that are each connected between the midpoint 10 and one of the two outer poles of the DC intermediate circuit 4. The bidirectional switches 11 are each composed of a pair of semiconductor switches 13 with opposite blocking directions and anti-parallel diodes 14.

The switches 9 are also composed of semiconductor switches and comprise blocking directions and anti-parallel diodes 15 in a conventional orientation. From the midpoints 10 of each half-bridge 6 to 8, a respective line 16 to 18 leads to one of three terminals 19 to 21 for one of the three phase conductors 22 to 24 of the AC grid 3. In this case, current sensors 25, inductors 26, two series-connected electromechanical switches 27 and 28 of a relay 29 as well as further inductors 30 and 31 are arranged in these lines 16 to 18. An additional terminal 32 for a neutral conductor 33 of the AC grid 3 is connected via a line 34 to the midpoint 12 of the DC intermediate circuit. 4 In this case, as seen from the midpoint 12, two series-connected electromechanical switches 35 and 36 of the relay 29 and inductors 37 and 38 coupled to the inductors 30 and 31 are provided in this line 34. The switches 35 and 36 are assigned to the relay 29, but are switchable independent of the switches 27 and 28.

Upstream of the switches 35 and 36, as seen from the midpoint 12, the line 34 is connected via capacitors 39 to the lines 16 to 18. Downstream of the switches 35 and 36 and between the inductors 37 and 38, further capacitors 40 are each connected to line 34 and one of the lines 16 to 18. Additional capacitors 41 are provided between all the lines 16 to 18 and 34 and ground 42. The inductors 26 and the filter capacitors 39 form a first filter 46 of the inverter 1, which may be designed as a sine filter. The inductors 30, 31, 37 and 38 and the capacitors 40 and 41 form a second filter 47 of the inverter 1, which may be designed as another sine filter and/or as a line filter of the inverter 1. Between the first filter 46 and the second filter 47, the switches 35 and 36 are provided in the line 34.

The inverter 1 is operated in a first operating mode with open switches 35 and 36, i.e. without galvanical connection between the midpoint 12 and the neutral conductor 33. However, if a residual current at the inverter 1 or a leakage current of the photovoltaic generator 2 that is determined by means of a residual current sensor 43 becomes too large or if under control of the current sensors 25 asymmetrical feeding into the individual phase conductors 22 to 24 is intended, the switches 35 and 36 are closed by a controller 44 of the inverter 1. The residual current sensor 43 is arranged in this case on the AC side of the inverter 1. It may, however, also be arranged on the DC side of the inverter. The controller 44 also determines the voltages between the lines 16 to 18 and the line 34, i.e. between each phase conductor 22 to 24 and the neutral conductor 33 via measuring devices 45. By this, the controller 44 indirectly also determines the voltages between the individual phase conductors 22 to 24. The controller generally closes the relay 29, i.e. at least the switches 27 and 28, only if the voltages emitted by the inverter 1 at the midpoints 10 of the half bridges 6 to 8 are synchronized with the voltages of the AC grid 3 measured by the measuring devices 45.

Depending on the position of the switches 35 and 36, the controller 44 also controls the switches 9 and 11 of the inverter bridge 5 via control lines not shown in FIG. 1. In the open state of the switches 35 and 36, this is done for example according to the method known from EP 2375552 A1, which is hereby incorporated by reference in its entirety. In the closed state of the switches 35 and 36, the control can be chosen such that either a symmetric or asymmetric feed into the phase conductors 22 to 24 of the AC grid 3 is realized; in the open state, only a symmetric feed is reasonable.

The invention claimed is:

1. A method of operating a transformerless inverter connected on the input side to a generator and on the output side to a multiphase AC grid and comprising a multi-phase inverter bridge with a switch between a midpoint of a DC intermediate circuit on the input side and a terminal for a neutral conductor of the multiphase AC grid, comprising:
   feeding electric power from the DC intermediate circuit into the AC grid by the inverter bridge with the switch closed when first operating conditions are present;
   opening the switch when there is a transition from the first operating conditions to second operating conditions different from the first operating conditions;
   feeding electric power from the DC intermediate circuit into the AC grid by the inverter bridge with the switch open when the second operating conditions are present; and
   closing the switch when there is a transition from the second operating conditions to the first operating conditions.

2. The method according to claim 1, wherein the second operating conditions comprise at least one of the following operating conditions:
   a residual current or leakage current measured at the inverter maintains a first current limit when the switch is open,
   a residual current or leakage current measured at the inverter maintains a second current limit when the switch is closed,
   a leakage capacitance determined for the generator connected to the DC intermediate circuit maintains a capacitance limit,
   an intermediate circuit voltage of the DC intermediate circuit does not reach a double value of the peak phase-to-neutral line voltage of the AC grid, and
   a symmetric feed into all phase conductors of the AC grid is intended.

3. The method according to claim 2, wherein the first operating conditions comprise at least one of the following operating conditions:
   the residual current or leakage current measured at the inverter exceeds the first current limit when the switch is open,
   the residual current or leakage current measured at the inverter exceeds the second current limit when the switch is closed,
   the leakage capacitance determined for the generator connected to the DC intermediate circuit exceeds the capacitance limit, and
   an asymmetric feed into the phase conductors of the AC grid is intended.

4. The method according to claim 1, further comprising reducing a residual current or leakage current measured at the inverter when the switch is open by increasing an intermediate circuit voltage of the DC intermediate circuit from above a peak phase-to-phase line voltage to above a double value of the peak phase-to-neutral line voltage of the AC grid.

5. A transformerless inverter with a DC intermediate circuit on the input side, a multiphase inverter bridge, input-side terminals for a generator, output-side terminals for a multiphase AC grid, a switch between a midpoint of the input-side DC intermediate circuit and the terminal for a neutral conductor of the multiphase AC grid and with a controller controlling the inverter bridge and the switch, wherein the controller is configured to:
   feed electric power from the DC intermediate circuit into the AC grid by the inverter bridge with the switch closed when first operating conditions are present;
   open the switch when there is a transition from the first operating conditions to second operating conditions different from the first operating conditions;
   feed electric power from the DC intermediate circuit into the AC grid by the inverter bridge with the switch open when the second operating conditions are present; and
   close the switch when there is a transition from the second operating conditions to the first operating conditions.

6. An inverter according to claim 5, further comprising a measuring device comprising a residual current sensor that is operably coupled to the controller and configured to measure a residual current at the inverter or a leakage current of the generator connected on the input side to the inverter.

7. The inverter according to claim 5, wherein the inverter bridge comprises a multi-level circuit with bidirectional switches between the midpoint of the DC intermediate circuit and midpoints of the half-bridges of the inverter bridge.

8. The inverter according to claim 5, wherein the switch is arranged in a line connecting the midpoint of the DC intermediate circuit to the terminal for the neutral conductor at a point located between first capacitors being connected to the line and lines leading from the inverter bridge to terminals for the phase conductors of the AC grid and second capacitors of the inverter that are connected to the line and the lines leading to the terminals for the phase conductors.

9. The inverter according to claim 8, further comprising a further switch in each line leading from the inverter bridge to the terminals for the phase conductors of the AC grid.

* * * * *